US009374534B2

(12) United States Patent  (10) Patent No.: US 9,374,534 B2
Chen  (45) Date of Patent: Jun. 21, 2016

(54) DISPLAY AND METHOD FOR DISPLAYING MULTIPLE FRAMES THEREOF

(71) Applicant: Wistron Corporation, New Taipei (TW)

(72) Inventor: Feng-Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 133 days.

(21) Appl. No.: 14/217,485

(22) Filed: Mar. 18, 2014

(65) Prior Publication Data

US 2015/0156424 A1 Jun. 4, 2015

(30) Foreign Application Priority Data

Dec. 4, 2013 (TW) .............................. 102144497 A

(51) Int. Cl.
H04N 9/74 (2006.01)
H04N 5/265 (2006.01)
G06T 11/60 (2006.01)
H04N 7/01 (2006.01)
G09G 5/00 (2006.01)
G09G 5/14 (2006.01)

(52) U.S. Cl.
CPC ................ H04N 5/265 (2013.01); G06T 11/60 (2013.01); G09G 5/00 (2013.01); H04N 7/0117 (2013.01); G09G 5/14 (2013.01)

(58) Field of Classification Search
CPC ..... H04N 7/0117; H04N 5/45; H04N 5/2624; H04N 5/44591; H04N 5/44513; H04N 5/44504; G06T 11/60
USPC .......................................................... 348/588
See application file for complete search history.

(56) References Cited

U.S. PATENT DOCUMENTS

| 7,420,620 B2 | 9/2008 | Habas et al. |
| 2011/0316992 A1 | 12/2011 | Cheng et al. |
| 2013/0093672 A1 | 4/2013 | Ichieda |
| 2013/0174208 A1* | 7/2013 | Lee .................... H04N 21/4122 725/109 |
| 2013/0207979 A1 | 8/2013 | Yepez |
| 2014/0334381 A1* | 11/2014 | Subramaniam ....... H04L 65/604 370/328 |

FOREIGN PATENT DOCUMENTS

| CN | 103049233 | 4/2013 |
| TW | 201201566 | 1/2012 |
| TW | 201337900 | 9/2013 |

OTHER PUBLICATIONS

"Office Action of Taiwan Counterpart Application," issued on May 22, 2015, with English translation thereof, p. 1-p. 20.

* cited by examiner

Primary Examiner — Michael Lee
(74) Attorney, Agent, or Firm — Jianq Chyun IP Office

(57) ABSTRACT

A display and a method for displaying multiple frames thereof are provided. In the method, a source device is connected by a video cable. A multiple frame displaying request sent by the source device is received through the video cable. Then, an original resolution of the display is divided into several adjusted resolutions according to the number of frames in the request, and at least one resolution data respectively recording the adjusted resolutions is sent to the source device. At least one video stream sent by the source device is received through the video cable, and frames of the at least one video stream are respectively displayed on at least one corresponding display region of the display.

18 Claims, 4 Drawing Sheets

DISPLAY AND METHOD FOR DISPLAYING MULTIPLE FRAMES THEREOF

CROSS-REFERENCE TO RELATED APPLICATION

This application claims the priority benefit of Taiwan application serial no. 102144497, filed on Dec. 4, 2013. The entirety of the above-mentioned patent application is hereby incorporated by reference herein and made a part of this specification.

BACKGROUND OF THE INVENTION

1. Field of the Invention

The invention relates to a display and a displaying method thereof, and more particularly relates to a display and a multiple frame displaying method thereof.

2. Description of Related Art

With the progress of display technology, the display is developed to provide various functions. Picture by picture (PBP) is a display mode that displays videos from different signal sources side by side on the same display, which allows the user to watch several videos or shows on the same display.

In order to implement PBP on the display, the current method requires the user to respectively connect two source devices to two video ports of the display, or respectively connect two video connection ports of a source device to two video connection ports of the display, so as to transmit video streams from the source device to the display. The aforementioned video connection port is a video graphics array (VGA) connection port or a high definition multimedia interface (HDMI) connection port, for example. The video streams provided by the source device are respectively received and extracted by two scalers inside the display, and then frames of the two video streams are displayed in parallel on the left and right sides of the display. However, for the aforementioned method, two video cables are needed for transmitting the video signals, which requires wiring and is inconvenient for the user.

In addition, extended display identification data (EDID) are stored in the respective memories (e.g. read-only memory (ROM)) for different video connection ports, and the data records information such as model number and specification of the display. Thus, the source device can obtain the native resolution of the display by accessing the EDID so as to provide video streams conforming to the native resolution.

Because the EDID on the two video connection ports both record the native resolution of the display, the source device provides the video streams in accordance with the native resolution. As a result, when the display presents two video streams by PBP, the resolutions of the video streams do not match the resolution of the frame that is actually displayed (namely, the horizontal resolution is half of the native resolution) and cause the displayed frames to be compressed and distorted.

SUMMARY OF THE INVENTION

Accordingly, the invention provides a display and a multiple frame displaying method thereof, through which only one video cable is required to transmit a plurality of video streams to be displayed by the display and accordingly image distortion can be prevented.

The multiple frame displaying method of the invention is adapted for the display. In the method, a source device is connected through the video cable. Then, a multiple frame displaying request sent by the source device is received through the video cable. An original resolution of the display is divided into a plurality of adjusted resolutions according to the number of frames in the multiple frame displaying request, and at least one resolution data respectively recording the adjusted resolutions is transmitted to the source device. Next, at least one video stream sent by the source device is received through the video cable, and frames of the at least one video video stream is respectively displayed on at least one corresponding display region of the display.

In an embodiment of the invention, the step of dividing the original resolution of the display into the adjusted resolutions according to the number of frames in the multiple frame displaying request further includes dividing the original resolution into the adjusted resolutions according to the number of frames and a display mode in the multiple frame displaying request, wherein the display mode includes Picture in Picture (PIP), Picture by Picture (PBP), and Picture on Picture (POP).

In an embodiment of the invention, the step of dividing the original resolution into the adjusted resolutions according to the number of frames and the display mode in the multiple frame displaying request includes dividing a horizontal resolution of the original resolution to reduce a horizontal resolution of each adjusted resolution to half of the horizontal resolution of the original resolution when the display mode is PBP.

In an embodiment of the invention, the step of dividing the original resolution into the adjusted resolutions according to the number of frames and the display mode in the multiple frame displaying request includes determining an adjusted resolution of a sub frame according to a position or a ratio of the sub frame with respect to a mother frame when the display mode is PIP.

In an embodiment of the invention, the step of dividing the original resolution into the adjusted resolutions according to the number of frames and the display mode in the multiple frame displaying request includes determining an adjusted resolution of each of a plurality split frames according to a position or a ratio of the split frame with respect to an original frame when the display mode is POP.

In an embodiment of the invention, the step of respectively displaying the at least one frame of the video stream on the corresponding at least one display region of the display further includes determining the display region where the frame of each video stream is displayed on the display according to the display mode, and respectively displaying the frame of the video stream on the determined display region.

In an embodiment of the invention, the display includes a display controller having a first interface port and a second interface port, and the step of receiving the at least one video stream sent by the source device through the video cable includes receiving the at least one video stream through the first interface port to extract a first stream from the at least one video stream and outputting the at least one video stream to the second interface port, and receiving the at least one video stream through the second interface port to extract a second stream from the at least one video stream.

In an embodiment of the invention, the step of respectively displaying the frames of the at least one video stream on the corresponding at least one display region of the display includes respectively displaying frames of the first stream and the second stream on the at least one display region.

In an embodiment of the invention, after the step of transmitting the at least one resolution data respectively recording the adjusted resolutions to the source device, the multiple frame displaying method further includes adjusting a resolution of the transmitted video stream to conform to the adjusted resolution according to the at least one resolution data by the source device.

In an embodiment of the invention, the resolution data is extended display identification data (EDID).

A display of the invention includes a display panel, a memory, a connection port, and a display controller. The memory is configured to store an original resolution of the display panel. The connection port is connected to a source device through a video cable and configured to receive a multiple frame displaying request and at least one video stream sent by the source device through the video cable. The display controller is coupled to the display panel, the memory, and the connection port. The display controller divides an original resolution of the display into a plurality of adjusted resolutions according to the number of frames in the multiple frame displaying request, transmits at least one resolution data respectively recording the adjusted resolutions to the source device, and respectively displays frames of the at least one video stream sent by the source device on at least one corresponding display region of the display panel.

In an embodiment of the invention, the display controller further divides the original resolution into the adjusted resolutions according to the number of frames and a display mode in the multiple frame displaying request, wherein the display mode includes Picture in Picture (PIP), Picture by Picture (PBP), and Picture on Picture (POP).

In an embodiment of the invention, the display controller divides a horizontal resolution of the original resolution to reduce a horizontal resolution of each adjusted resolution to half of the horizontal resolution of the original resolution when determining that the display mode is PBP.

In an embodiment of the invention, the display controller determines an adjusted resolution of a sub frame according to a position or a ratio of the sub frame with respect to a mother frame when determining that the display mode is PIP.

In an embodiment of the invention, the display controller determines an adjusted resolution of each split frame according to a position or a ratio of each of a plurality of split frames with respect to an original frame when determining that the display mode is POP.

In an embodiment of the invention, the display controller further determines the display region where the frame of each video stream is displayed on the display according to the display mode, and respectively displays the frame of the video stream on the determined display region.

In an embodiment of the invention, the memory further stores the adjusted resolutions corresponding to different numbers of frames and different display modes for the display controller to access.

In an embodiment of the invention, the display controller includes a first interface port and a second interface port, the display controller receives the at least one video stream through the first interface port for extracting a first stream from the at least one video stream and outputting the at least one video stream to the second interface port, and the display controller receives the at least one video stream through the second interface port for extracting a second stream from the at least one video stream.

In an embodiment of the invention, the display controller respectively displays frames of the first stream and the second stream on the at least one display region, and the first interface port and the second interface port are daisy chained.

In an embodiment of the invention, the resolution data is extended display identification data (EDID).

Based on the above, the display and the multiple frame displaying method thereof in the embodiments of the invention utilize a display port (DP) that supports multi-stream transport (MST) to transmit multiple video streams to the display through a single video cable, so as to achieve multiple frame display, and notify the source device to adjust the resolution of each video stream according to the number of frames and the display modes, such that the resolution of each video stream conforms to the resolution of the frame that is actually displayed. Therefore, the user is not required to perform multiple wiring, and image distortion of the displayed frame is prevented.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Display port (referred to as "DP" hereinafter) is a video transmission interface adopting a micro-packet architecture, which is capable of providing multiple stream transport (MST). The invention utilizes the aforementioned technology to transmit multiple video streams provided by a single source device to a display through a single video cable for displaying multiple frames on the display. In addition, the invention adjusts resolution data to be provided to the source device according to a multiple frame displaying request from the source device, such that the resolutions of the video streams provided by the source device can conform to the resolutions of the video streams that are actually displayed by the display, thereby preventing distortion due to compression of the displayed images and achieving favorable display effects in multiple frames.

Figure 1:
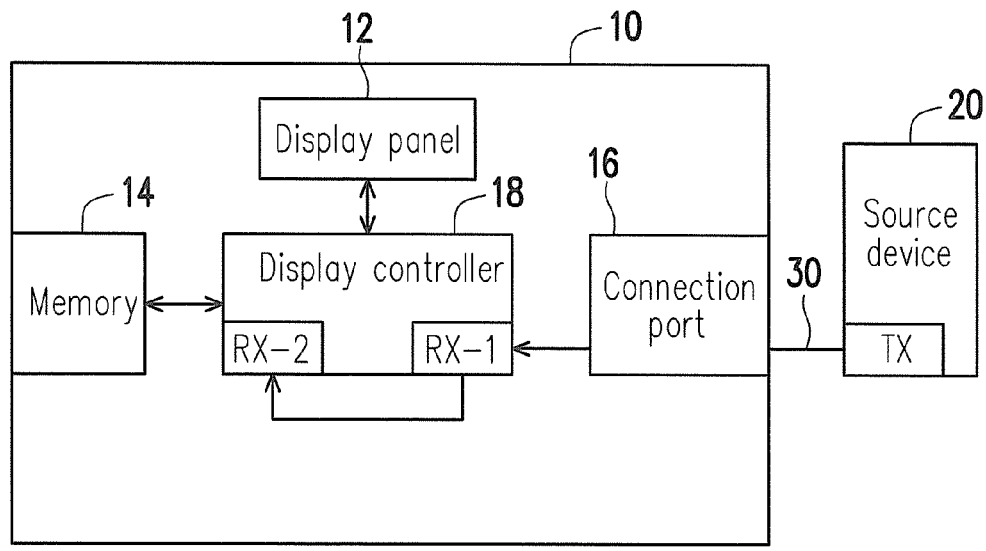
FIG. 1 is a block diagram of a display according to an embodiment of the invention.

FIG. 1 is a block diagram of a display according to an embodiment of the invention, which also illustrates a connection relationship between a display 10 and a source device 20. Referring to FIG. 1, the display 10 includes a display panel 12, a memory 14, a connection port 16, and a display controller 18. The display 10 is, for example, a liquid crystal display (LCD), a light-emitting diode display (LED), a field emission display (FED), or other types of displays. The source device 20 may be a computer which supports multi-stream transport with DPs of different specifications (e.g. DP1.2) or an electronic device capable of providing video streams. The invention is not intended to limit the types of the display and the source device.

The display panel 12 is, for example, an LCD panel, an LED display panel, a FED panel, or any other suitable display panels. The memory 14 is, for example, a fixed or movable random access memory (RAM), a read-only memory (ROM), a flash memory, other similar devices, or a combination of the above, and used for storing an original resolution of the display panel 12 (i.e. an original resolution of the display 10). In this embodiment, the memory 14 for example stores multiple extended display identification data (EDID), which respectively record resolution data corresponding to the video streams in the multi-stream transport.

The connection port 16 may be a transmission interface that conforms to DP1.2 and capable of supporting multi-stream transport. Alternatively, the connection port 16 may also be other transmission interfaces supporting multi-stream transport. The invention is not intended to limit the type of the connection port 16. In this embodiment, The connection port 16 through DP1.2 for supporting multi-stream transport function, and a high transmission speed of DP1.2, the connection port 16 is capable of simultaneously transmitting a plurality of video streams through a single cable. Therefore, the display 10 of this embodiment uses the connection port 16 to connect with a connection port TX of the source device 20 through a video cable 30, so as to receive a multiple frame displaying request and at least one video stream sent by the source device 20.

The display controller 18 may be a scaler or a controller having an image scaling function. In this embodiment, the display controller 18 is coupled to the display panel 12, the memory 14, and the connection port 16, and configured to divide the original resolution of the display panel 12 into a plurality of adjusted resolutions according to the number of frames in the multiple frame displaying request and notify the source device 20 to adjust the resolutions of the video streams provided thereby, so as to display the video streams sent by the source device 20 on the display panel 12.

Figure 2:
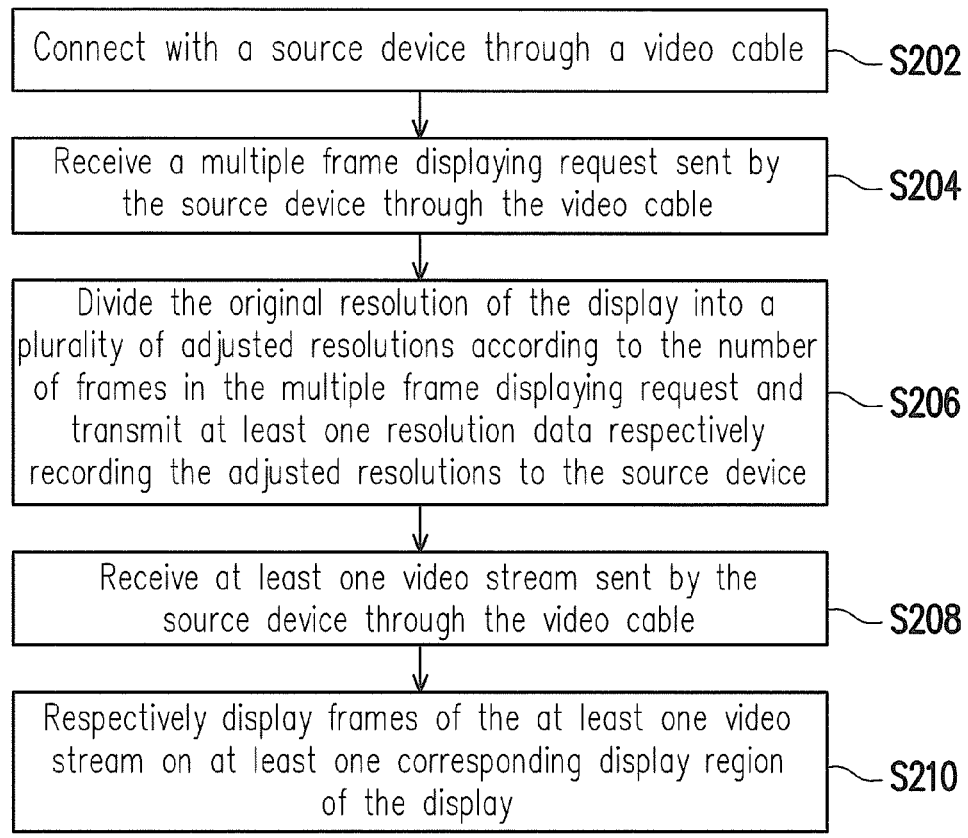
FIG. 2 is a flowchart showing a multiple frame displaying method according to an embodiment of the invention.

FIG. 2 is a flowchart showing a multiple frame displaying method according to an embodiment of the invention. With reference to FIG. 1 and FIG. 2, the multiple frame displaying method of this embodiment is adapted for the aforementioned display 10. Steps of the multiple frame displaying method of this embodiment are explained in detail below with reference to the components of the display 10 of FIG. 1.

First, the display 10 is connected to the source device 20 through the connection port 16 by the video cable 30 (Step S202). In this embodiment, the connection port 16 is a display port that conforms to DP1.2. With the multiple data stream transmission function provided by DP1.2 and the high transmission speed of DP1.2, the display 10 of this embodiment is capable of receiving multiple video streams of the source device 20 through the video cable 30 that connects between the display 10 and the source device 20.

Next, the display 10 uses the connection port 16 to receive a multiple frame displaying request sent by the source device 20 through the video cable 30 (Step S204). More specifically, in this embodiment, the multiple frame displaying request records the number of frames that the source device 20 intends to display on the display 10 or the number of video streams provided by the source device 20, for example. For instance, when the user controls the source device 20 to output two video streams, the source device 20 transmits information that the number of the frames is 2 to the display 10 through the multiple frame displaying request.

After the display 10 receives the multiple frame displaying request from the source device 20, the display controller 18 divides the original resolution of the display 10 into a plurality of adjusted resolutions according to the number of frames in the multiple frame displaying request and transmits at least one resolution data respectively recording the adjusted resolutions to the source device 20 (Step S206). To be more specific, the resolution data may be extended display identification data (EDID), which respectively records the resolution of each frame on the display panel 12. The extended display identification data is stored in the memory 14 to be accessed by the display controller 18 and transmitted to the source device 20. That is to say, in this embodiment of the invention, the adjusted resolutions are provided to the source device 20 through the display controller 18, such that the source device 20 transmits video streams with corresponding resolutions to the display 10. Accordingly, the problem of image distortion, which occurs during display of multiple frames due to the discrepancy between resolutions of the video streams and the displayed frames, is improved.

In this embodiment, the display 10 displays the video streams received from the source device 20 in a picture by picture (PBP) manner. When the source device 20 intends to output two video streams, the number of the frames is recorded as 2 in the corresponding multiple frame displaying request. After receiving the multiple frame displaying request from the source device 20, the display controller 18 adjusts a horizontal resolution of the original resolution of the display 10 to half according to the number of frames recorded in the multiple frame displaying request to serve as the adjusted resolution and records the adjusted resolution in two resolution data respectively, and then transmits the two resolution data to the source device 20. It should be noted that, in an embodiment, when the display 10 receives the multiple frame displaying request, a display mode set by the user is checked first, for example. If the display mode set by the user is PBP, two resolution data containing the adjusted resolution are provided to the source device 20; and if the display mode set by the user is a single frame, one resolution data containing the original resolution is provided to the source device 20.

For instance, in an embodiment, the original resolution of the display panel 12 of the display 10 is 2560×1600 pixels. When the display 10 receives the multiple frame displaying request of the source device 20 through the connection port 16 and learns that the number of the frames is 2, the display controller 18 adjusts the horizontal resolution of the display 10 to 1280 accordingly and records the adjusted horizontal resolution in the resolution data. In other words, the display resolution recorded in the resolution data is 1280×1600 pixels. Next, the display controller 18 transmits the resolution data recording the adjusted resolution to the source device 20.

In another embodiment, the display 10 stores in advance adjusted resolutions in the memory 14 corresponding to the PBP display mode to be accessed by the display controller 18 directly and provided to the source device 20. That is, in this embodiment, the display controller 18 is not required to process the original resolution of the display 10, and can directly obtain the adjusted resolutions corresponding to the number of frames from the memory 14 and provide the adjusted resolutions to the source device 20.

It should be noted that, after the display controller 18 transmits the at least one resolution data respectively recording the adjusted resolutions to the source device 20, the source device 20 adjusts the resolutions of the transmitted video streams according to the resolution data, such that the resolutions of the transmitted video streams conform to the adjusted resolutions. In other words, the display controller 18 of this embodiment provides the actual frame resolution to the source device 20 by means of the adjusted resolutions recorded in the resolution data, such that the source device 20 transmits the video streams according to the actual frame resolution, so as to improve the problem of image distortion that occurs during display of multiple frames due to discrepancy between the resolutions of the video streams and the resolution of the frame that is actually displayed by the display 10. On the other hand, if the source device 20 transmits only one video stream, the display controller 18 directly transmits the original resolution of the display 10 to the source device 20. Consequently, the source device 20 provides the video stream with the original resolution to the display 10.

In addition, in an embodiment, when the display 10 receives the multiple frame displaying request, the display mode set by the user is checked first, for example. If the display mode set by the user is PBP, two resolution data containing the adjusted resolutions are provided to the source device 20; and if the display mode set by the user is single frame, one resolution data containing the original resolution is provided to the source device 20.

Referring to the flowchart of FIG. 2 again, the display 10 uses the connection port 16 to receive at least one video stream sent by the source device 20 through the video cable 30 (Step S208). More specifically, in an embodiment, the display controller 18 includes a first interface port RX-1 and a second interface port RX-2, for example, wherein the first interface port RX-1 and the second interface port RX-2 are connected in a daisy chain manner. In this embodiment, the video streams that the source device 20 intends to transmit include a first stream and a second stream. Thus, after the display 10 receives two video streams sent by the source device 20 through the connection port 16 that conforms to DP1.2, the display controller 18 uses the first interface port RX-1 to receive the aforementioned video streams and extracts the first stream from the video streams and then outputs the received video streams to the second interface port RX-2. Thereafter, the display controller 18 uses the second interface port RX-2 to receive the video streams and extracts the second stream from the video streams. It should be noted that the first interface port RX-1 and the second interface port RX-2 respectively correspond to the frames displayed on the display 10 and correspond to the corresponding video streams. That is to say, through different interface ports, the display controller 18 is able to process each video stream separately such as converting a signal of the video stream, determining a display position of each video stream, and respectively transmitting the video streams to the display panel 12. Moreover, in other embodiments, each video stream may be processed respectively by multiple display controllers each having a single interface port. The invention is not intended to limit the ways of implementing the display controller and the interface port.

An embodiment is given below to describe in detail the display with the display controller having the first interface port and the second interface port. In an embodiment, the source device 20 is a computer that supports multi-stream transport of DP1.2, and the display 10 has the connection port 16 that conforms to DP1.2 and supports daisy chain transmission for connecting the first interface port RX-1 with the second interface port RX-2 of the display controller 18. When the source device 20 is connected to the first interface port RX-1 of the display controller 18 through the video cable 30 and the connection port 16, the display controller 18 processes the first stream through the first interface port RX-1. In addition, the video streams sent by the source device 20 may be further transmitted to the second interface port RX-2 directly from the first interface port RX-1 for the display controller 18 to process the second stream through the second interface port RX-2. In other words, the display 10 of this embodiment requires only one cable to receive the video streams from the source device, and then the interface ports, corresponding to the number of frames, in the display controller 18 can extract the video streams. Accordingly, the user does not need to manually connect the video cable corresponding to each frame, which eliminates the need for wiring during operation.

Then, the display controller 18 respectively displays frames of the video streams on at least one corresponding display region of the display 10 (Step S210). More specifically, in an embodiment, after the display 10 extracts the first stream and the second stream from the video streams through the first interface port RX-1 and the second interface port RX-2, the display controller 18 respectively displays frames of the first stream and the second stream on the display regions. For example, in an embodiment, the display 10 displays the received multiple video streams in the PBP manner. Therefore, when the display controller 18 uses the first interface port RX-1 and the second interface port RX-2 to extract and obtain the first and second streams, the display controller 18 displays the first stream and the second stream in sequence from the left to the right on the display panel 12. It should be noted that, because the source device 20 provides the first stream and the second stream based on the adjusted horizontal resolution, the display 10 of this embodiment is able to display the first stream and the second stream on the display panel 12 without compressing frames of the first stream and the second stream or adjusting a frame ratio thereof.

Therefore, this embodiment of the invention transmits multiple video streams to the display to achieve multiple frame display by using only one video cable and notifies the source device to adjust the resolution of each video stream according to the number of frames, such that the resolutions of the provided video streams conform to the resolution of the frame that is actually displayed, thereby improving the problem of image distortion that may occur during display of multiple frames and achieving favorable display effects.

It should be noted that the above embodiments illustrate the situation of displaying multiple video streams on the display in PBP. The invention may also be embodied corresponding to other display modes of multiple frames. Embodiments for different display modes of multiple frames are explained hereinafter.

Figure 3:
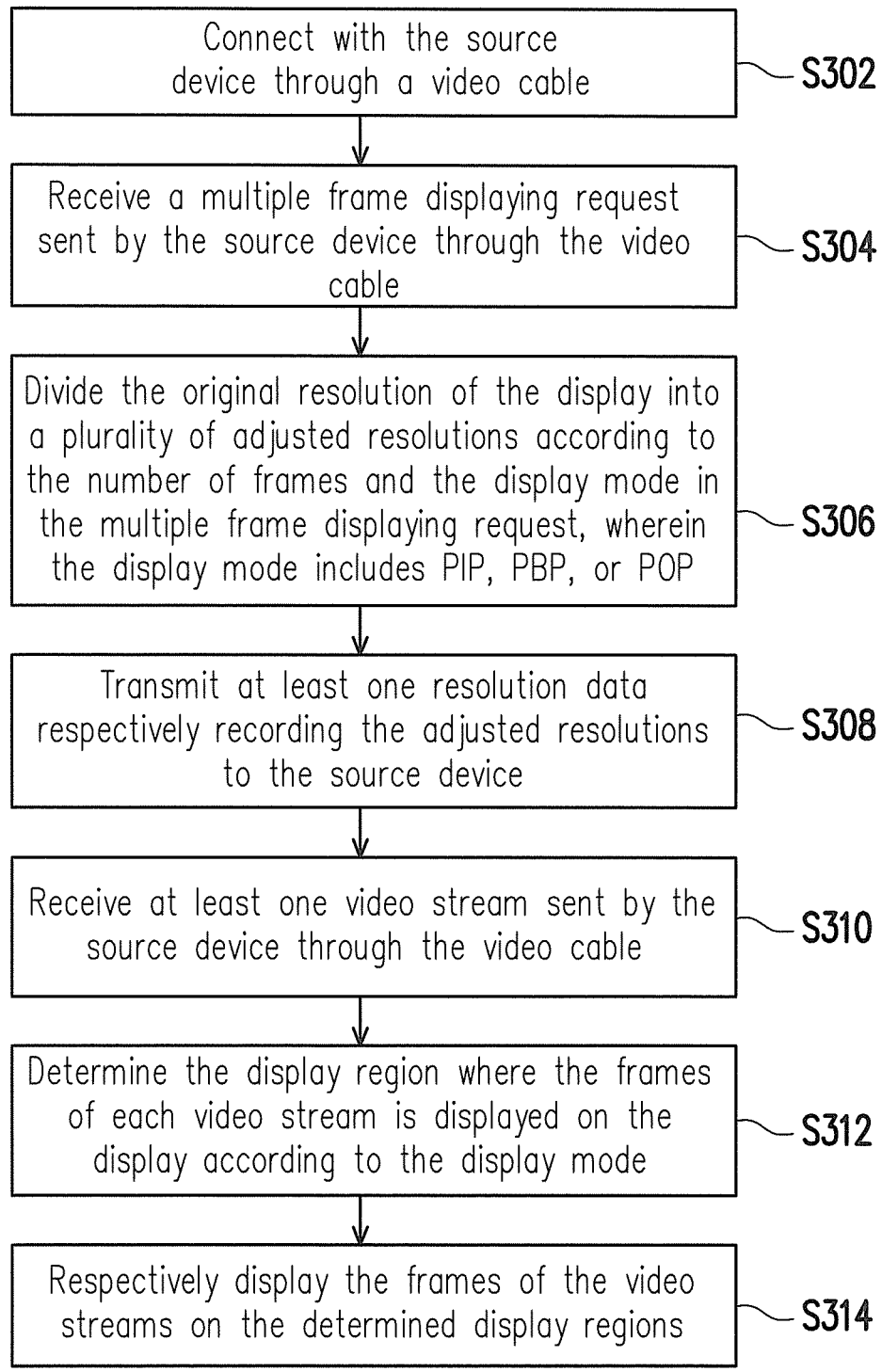
FIG. 3 is a flowchart showing a multiple frame displaying method according to an embodiment of the invention.

FIG. 3 is a flowchart showing a multiple frame displaying method according to an embodiment of the invention. First, with reference to FIG. 3, the display 10 is connected to the source device 20 through the connection port 16 by the video cable 30 (Step S302). Next, the display 10 uses the connection port 16 to receive a multiple frame displaying request sent by the source device 20 through the video cable 30 (Step S304). Steps S302-S304 are similar to Steps S202-S204 of the above embodiments. For details, please refer to the above descriptions.

A difference between this embodiment and the aforementioned embodiments lies in that: after the display 10 receives the multiple frame displaying request, the display controller 18 further divides the original resolution into adjusted resolutions according to the number of frames and the display mode in the multiple frame displaying request. Herein, the display mode may include a Picture in Picture (PIP) display mode, a Picture by Picture (PBP) display mode, or a Picture on Picture (POP) display mode, etc. (Step S306). The display mode may be set on the display 10 by the user or requested by the source device 20. The invention is not intended to limit the type of the display mode. Embodiments of the aforementioned PBP display mode, PIP display mode, and POP display mode are respectively explained below.

Figure 4:
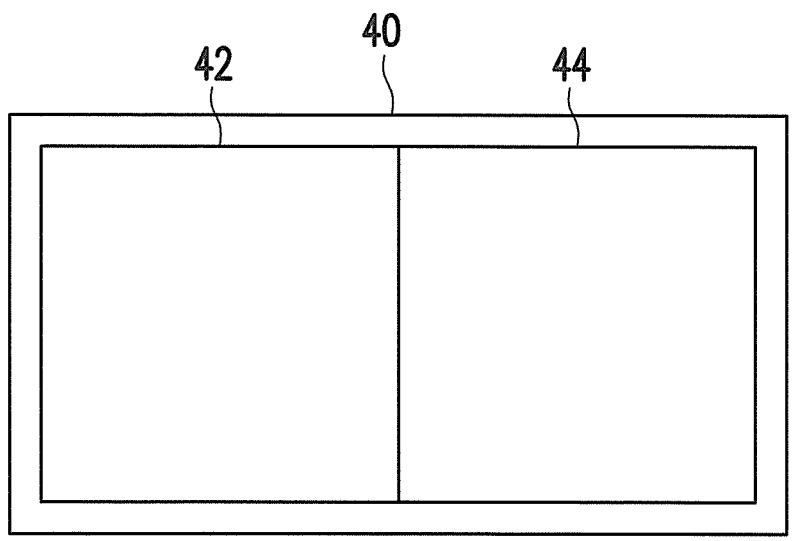
FIG. 4 illustrates an example of a multiple frame displaying method according to an embodiment of the invention.

First, a situation of the PBP display mode is described with reference to the example shown in FIG. 4. When the display mode is PBP, the display controller 18 divides the horizontal resolution of the original resolution to reduce the horizontal resolution of each adjusted resolution to half of the horizontal resolution of the original resolution. For example, if the original resolution of a display 40 in FIG. 4 is 2560×1600 pixels, the display controller 18 adjusts the horizontal resolution of the original resolution from 2560 to 1280, so as to obtain the adjusted resolution of 1280×1600 pixels. Implementation of PBP is specified in the above embodiments. For details, please refer to descriptions of the above embodiments.

It is worth mentioning that, in the PBP display mode of the embodiment of the invention, the frames are not necessarily arranged laterally on the left and the right (e.g. frames 42 and 44 in FIG. 4). In an embodiment, the video streams are displayed vertically by top and bottom frames on the display 10. In that case, the display controller 18 adjusts a vertical resolution of the original resolution to reduce a vertical resolution of the adjusted resolution to half of the vertical resolution of the original resolution. Moreover, in another embodiment, the source device 20 adjusts the resolutions corresponding to the video streams in light of how the display 10 is placed or a rotation angle of the display 10. For example, in the case that the display 10 is rotated 90 degrees and placed, if the display 10 is set to display the frames laterally on the left and the right in the PBP manner, the source device 20 changes to adjust the vertical resolution of the original resolution corresponding to the rotation of the display 10. That is to say, the invention is not intended to limit the PBP arrangement of the video streams on the display 10.

Figure 5:
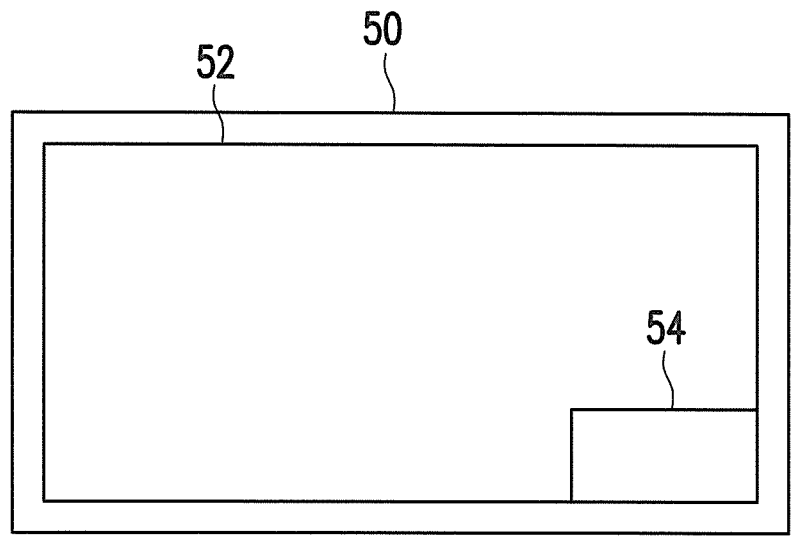
FIG. 5 illustrates an example of a multiple frame displaying method according to an embodiment of the invention.

Next, a situation of the PIP display mode is described with reference to the example shown in FIG. 5. When the display mode is PIP, the display controller determines an adjusted resolution of a sub frame 54 according to a position or ratio of the sub frame 54 with respect to a mother frame 52. For instance, in the embodiment of FIG. 5, the ratio of each side of the sub frame 54 to each side of the mother frame 52 in a display 50 is 1:4, and the sub frame 54 is displayed at the lower right corner of the mother frame 52. Thus, in this embodiment, the display controller adjusts the resolution corresponding to the sub frame 54 according to the ratio of the sub frame 54 and the mother frame 52. If the original resolution corresponding to the mother frame 52 is 2560×1600 pixels, the display controller adjusts the resolution corresponding to the sub frame 54 to 640×400 pixels according to the ratio of 1:4. In another embodiment, the display controller uses the position of the sub frame 54 with respect to the mother frame 52 (e.g. corresponding positions at four points of the sub frame 54 and the mother frame 52) as a basis for adjusting the resolution. It should be noted that the arrangement of the sub frame and the mother frame in the display, as illustrated, is merely an example. The invention is not intended to limit the positions and ratio of the sub frame and the mother frame in the display.

Figure 6:
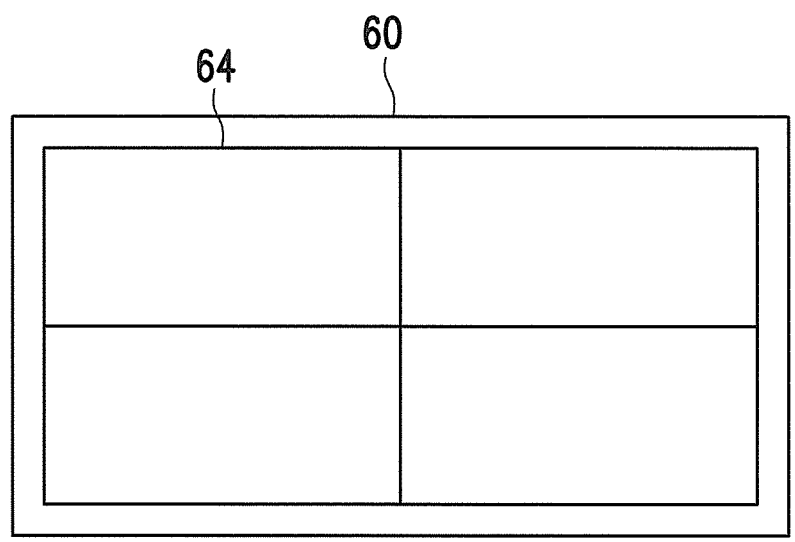
FIG. 6 illustrates an example of a multiple frame displaying method according to an embodiment of the invention.

As to a situation of the POP display mode, please refer to the example shown in FIG. 6. When the display mode is POP, the display controller determines the adjusted resolution of each of the split frames 64 according to a position or ratio of each split frame 64 with respect to an original frame. For example, in an embodiment, a display 60 provides four frames that are equally divided (e.g. four split frames 64 of FIG. 6) to display a plurality of video streams. Therefore, if the original resolution of the original frame is 2560×1600 pixels, the display controller 18 determines that the resolution of each split frame is 1280×800 pixels. In an embodiment, the display controller 18 arranges the split frames around the original frame. Moreover, in other embodiments, the display 60 further provides other splitting methods. For example, the number of the split frames may be varied according to different equal divisions of the original frame (e.g. 9 or 16 equal divisions), or the split frames may have different ratios corresponding to a splitting ratio (e.g. 3:2 or 16:9) of the original frame. In addition, the user may directly adjust a specific position of a splitting line on the frame. The scope of the embodiment of the invention covers any arrangement as long as each split frame 64 is displayed on the display 60.

It should be noted that, in an embodiment, a method for determining the adjusted resolution is decided by the display controller 18 according to the number of frames or the display mode. In another embodiment, the memory 14 further stores adjusted resolutions corresponding to different numbers of frames and different display modes for the display controller 18 to access. Accordingly, the display controller 18 directly obtains the adjusted resolutions from the memory 14 and records the adjusted resolutions in the resolution data.

Reverting to the flowchart of FIG. 3, after the display controller 18 divides the original resolution of the display 10 into a plurality of adjusted resolutions according to the number of frames and the display mode, the display controller 18 transmits at least one resolution data respectively recording the adjusted resolutions to the source device 20 (Step S308). Then, the display 10 uses the connection port 16 to receive at least one video stream sent by the source device 20 through the video cable 30 (Step S310). Steps S308-S310 are the same as or similar to Steps S206-S208 of the above embodiments. For details, please refer to the above descriptions.

Thereafter, the display controller 18 determines a display region where the frame of each video stream is displayed on the display 10 according to the display mode (Step S312). For example, for the PBP display mode, the display controller 18 determines to display the video streams respectively on the left and the right of the display 10 corresponding to the PBP arrangement (e.g. the frames 42 and 44 of FIG. 4). Or, when the display mode is PIP, the display controller 18 determines to display the sub frame (e.g. the sub frame 54 of FIG. 5) at the lower right corner or other positions of the display 10, and determines the size of the display region. However, the invention is not limited to the above. The user may decide the display region corresponding to the frame of each video stream according to his needs.

Then, the display controller 18 respectively displays the frames of the video streams on the determined display regions (Step S314), which is similar to Step S210 in the above embodiment. For details, please refer to descriptions of the above embodiment.

Accordingly, this embodiment may further notify the source device to adjust the resolution of each video stream according to the number of frames and the display mode, such as PBP, PIP, or POP. Thus, multiple video streams can be transmitted for display by using a single video cable. When multiple frames are displayed, the resolution of each video stream can conform to the resolution of each frame so as to produce a favorable multiple frame display effect.

It is worth mentioning that the multiple frame displaying method of the embodiments of the invention is also applicable to panoramic display and thus achieves various applications. More specifically, in an embodiment, the extended display identification data further includes a field for recording tilted display for determining the position of the frame of each video stream on the display panel 12. By combining the tilted display information in the extended display identification data with the multiple frame displaying method provided by the embodiments of the invention, when the video streams provided by the source device 20 correspond to panoramic display, multiple frame display is easily achieved to present a favorable panoramic display effect.

To sum up, the display and the multiple frame displaying method thereof in the embodiments of the invention utilize the display port that supports multi-stream transport to transmit multiple video streams to the display through a single video cable, so as to achieve multiple frame display, and notify the source device to adjust the resolution of each video stream according to the number of frames and various display modes (e.g. PBP, PIP, or POP), such that the resolution of each video stream conforms to the resolution of the frame that is actually displayed. Therefore, the user is not required to perform multiple wiring, and image distortion is prevented so as to produce a favorable multiple frame display effect.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A multiple frame displaying method, adapted for a display, the multiple frame displaying method comprising:
   connecting with a source device through a video cable;
   receiving a multiple frame displaying request sent by the source device through the video cable;
   dividing an original resolution of the display into a plurality of adjusted resolutions according to a number of frames and a display mode in the multiple frame displaying request, and transmitting at least one resolution data respectively recording the adjusted resolutions to the source device, wherein the display mode comprises Picture in Picture (PIP), Picture by Picture (PBP), or Picture on Picture (POP);
   receiving at least one video stream sent by the source device through the video cable; and
   respectively displaying frames of the at least one video stream on at least one corresponding display region of the display.

2. The multiple frame displaying method according to claim 1, wherein the step of dividing the original resolution into the adjusted resolutions according to the number of frames and the display mode in the multiple frame displaying request further comprises:
   dividing a horizontal resolution of the original resolution to reduce a horizontal resolution of each adjusted resolution to half of the horizontal resolution of the original resolution when the display mode is PBP.

3. The multiple frame displaying method according to claim 1, wherein the step of dividing the original resolution into the adjusted resolutions according to the number of frames and the display mode in the multiple frame displaying request further comprises:
   determining an adjusted resolution of a sub frame according to a position or a ratio of the sub frame with respect to a mother frame when the display mode is PIP.

4. The multiple frame displaying method according to claim 1, wherein the step of dividing the original resolution into the adjusted resolutions according to the number of frames and the display mode in the multiple frame displaying request further comprises:
   determining an adjusted resolution of each of a plurality of split frames according to a position or a ratio of the split frame with respect to an original frame when the display mode is POP.

5. The multiple frame displaying method according to claim 1, wherein the step of respectively displaying the frames of the at least one video stream on the at least one corresponding display region of the display further comprises:
   determining the display region where the frame of each video stream is displayed on the display according to the display mode; and
   respectively displaying the frame of the video stream on the determined display region.

6. The multiple frame displaying method according to claim 1, wherein after the step of transmitting the at least one resolution data respectively recording the adjusted resolutions to the source device, the method further comprises:
   adjusting a resolution of the at least one video stream to conform to the adjusted resolution according to the at least one resolution data by the source device.

7. The multiple frame displaying method according to claim 1, wherein the at least one resolution data comprises extended display identification data (EDID).

8. A display, comprising:
   a display panel;
   a memory, configured to store an original resolution of the display panel;
   a connection port, connected to a source device through a video cable, and configured to receive a multiple frame displaying request and at least one video stream sent by the source device through the video cable; and
   a display controller, coupled to the display panel, the memory, and the connection port, and configured to divide an original resolution of the display into a plurality of adjusted resolutions according to a number of frames and a display mode in the multiple frame displaying request, transmit at least one resolution data respectively recording the adjusted resolutions to the source device, and respectively displaying frames of the at least one video stream sent by the source device on at least one corresponding display region of the display panel,
   wherein the display mode comprises Picture in Picture (PIP), Picture by Picture (PBP), or Picture on Picture (POP).

9. The display according to claim 8, wherein the display controller divides a horizontal resolution of the original resolution to reduce a horizontal resolution of each adjusted resolution to half of the horizontal resolution of the original resolution when determining that the display mode is PBP.

10. The display according to claim 8, wherein the display controller determines an adjusted resolution of a sub frame according to a position or a ratio of the sub frame with respect to a mother frame when determining that the display mode is PIP.

11. The display according to claim 8, wherein the display controller determines an adjusted resolution of each of a plurality of split frames according to a position or a ratio of the split frame with respect to an original frame when determining that the display mode is POP.

12. The display according to claim 8, wherein the display controller further determines the display region where the frame of each video stream is displayed on the display according to the display mode, and respectively displays the frame of the video stream on the determined display region.

13. The display according to claim 8, wherein the memory further stores the adjusted resolutions corresponding to different numbers of frames and different display modes for the display controller to access.

14. The display according to claim 8, wherein the resolution data comprises extended display identification data (EDID).

15. A multiple frame displaying method, adapted for a display, the display comprising a display controller having a first interface port and a second interface port, and the multiple frame displaying method comprising:
   connecting with a source device through a video cable;
   receiving a multiple frame displaying request sent by the source device through the video cable;
   dividing an original resolution of the display into a plurality of adjusted resolutions according to a number of frames in the multiple frame displaying request, and transmitting at least one resolution data respectively recording the adjusted resolutions to the source device;
   receiving at least one video stream sent by the source device through the video cable;
   receiving the at least one video stream through the first interface port to extract a first stream from the at least one video stream and outputting the at least one video stream to the second interface port;
   receiving the at least one video stream through the second interface port to extract a second stream from the at least one video stream; and
   respectively displaying frames of the at least one video stream on at least one corresponding display region of the display.

16. The multiple frame displaying method according to claim 15, wherein the step of respectively displaying the frames of the at least one video stream on the at least one corresponding display region of the display comprises:
   respectively displaying frames of the first stream and the second stream on the at least one corresponding display region.

17. A display, comprising:
   a display panel;
   a memory, configured to store an original resolution of the display panel;
   a connection port, connected to a source device through a video cable, and configured to receive a multiple frame displaying request and at least one video stream sent by the source device through the video cable; and
   a display controller, coupled to the display panel, the memory, and the connection port, and configured to divide an original resolution of the display into a plurality of adjusted resolutions according to a number of frames in the multiple frame displaying request, transmit at least one resolution data respectively recording the adjusted resolutions to the source device, and respectively displaying frames of the at least one video stream sent by the source device on at least one corresponding display region of the display panel,
   wherein the display controller comprises a first interface port and a second interface port, and the display controller receives the at least one video stream through the first interface port for extracting a first stream from the at least one video stream and outputs the at least one video stream to the second interface port, and receives the at least one video stream through the second interface port for extracting a second stream from the at least one video stream.

18. The display according to claim 17, wherein the display controller respectively displays frames of the first stream and the second stream on the at least one display region, and the first interface port and the second interface port are daisy chained.

\* \* \* \* \*